United States Patent [19]
Forg et al.

[11] 3,807,185
[45] Apr. 30, 1974

[54] HELIUM-ENRICHED HELIUM-HYDROGEN MIXTURE FROM AMMONIA SYNTHESIS VENT GAS USING REGENERATORS TO CONGEAL RESIDUAL NITROGEN

[75] Inventors: Wolfgang Forg; Wolfgang Schmid, both of Grunwald, Germany

[73] Assignee: Linde Aktiengesellschaft Zentrale Patentabitutung, Munich, Germany

[22] Filed: Feb. 26, 1971

[21] Appl. No.: 119,099

[30] Foreign Application Priority Data
Aug. 13, 1970 Germany............................ 2040371

[52] U.S. Cl............................. 62/22, 62/13, 62/28
[51] Int. Cl............................. F25j 1/02, F25j 3/02
[58] Field of Search............... 62/12, 13, 22, 23, 24, 62/27, 28; 23/198–199; 423/359

[56] References Cited
UNITED STATES PATENTS

| | | | |
|---|---|---|---|
| 2,960,836 | 11/1960 | Haringhuizen | 62/13 |
| 3,036,439 | 5/1962 | Haringhuizen | 62/28 |
| 3,490,245 | 1/1970 | Muenger | 62/12 |
| 2,959,926 | 11/1960 | Haringhuizen | 62/13 |
| 3,407,614 | 10/1968 | Poska | 62/23 |
| 3,543,528 | 12/1970 | Crawford | 62/22 |
| 3,691,779 | 9/1972 | Meisler | 62/22 |
| 2,993,342 | 7/1961 | Koble | 62/22 |
| 1,676,225 | 7/1928 | Tolman | 62/22 |

*Primary Examiner*—Norman Yudkoff
*Assistant Examiner*—Arthur F. Purcell
*Attorney, Agent, or Firm*—Millen, Raptes & White

[57] ABSTRACT

For the production of helium, a helium-containing vent gas from an ammonia synthesis gas is used as the starting material. The vent gas is subjected to several partial condensation steps and is also cooled in a regenerator to deposit residual nitrogen, argon and methane impurities. A stripping column is preferably employed to obtain pure liquid hydrogen and a gaseous helium-hydrogen mixture further enriched in helium.

3 Claims, 2 Drawing Figures

HELIUM-ENRICHED HELIUM-HYDROGEN MIXTURE FROM AMMONIA SYNTHESIS VENT GAS USING REGENERATORS TO CONGEAL RESIDUAL NITROGEN

BACKGROUND OF THE INVENTION

This invention relates to a low temperature system for producing a helium-enriched helium-hydrogen mixture.

Almost all of the helium requirements of the Western World are presently supplied by extracting helium from helium-bearing natural gas found in the United States. The natural gas is cooled to a sufficiently low temperature to condense out methane; the remaining separated gas is generally a 70–30 mixture of helium and nitrogen and is called crude helium. Thus, unless nitrogen removal is required to adjust the thermal value of the natural gas, the low-temperature methane liquefaction and gas separation is conducted exclusively for the purpose of obtaining helium. This is a relatively costly procedure and can be justified only in those cases where the concentration of the helium in the natural gas is several thousand parts per million, as is the case in United States natural gas. Heretofore, the extraction of helium from natural gases having a lower helium concentration has not been profitable. Furthermore, since the yearly consumption of helium will increase in the future, and the supply of helium-rich natural gas will decrease, it would be desirable to provide an alternative method for producing helium at a relatively low cost.

SUMMARY OF THE INVENTION

It is a principal object of this invention to provide a novel and relatively inexpensive system for the production of helium from natural gases having a relatively low helium concentration.

Upon further study of the specification and appended claims, other objects and advantages of the present invention will become apparent.

These objects are attained, according to this invention, by employing, as the starting material, the vent gas from ammonia synthesis plants, the synthesis gas for said plants containing hydrogen produced by the cracking of helium-containing natural gas. The vent gas is partially condensed to liquefy methane, argon and the major portion of the nitrogen contained therein. Residual nitrogen, as well as traces of argon and methane are congealed in regenerators, a major portion of hydrogen is removed from the remaining mixture of hydrogen and helium by means of a further partial condensation step.

The success of this invention results from the fact that the noble gases present in the hydrogen-nitrogen synthesis gas exhibit an inert behavior during the ammonia synthesis and build up during the synthesis cycle. The same holds true for the methane unreacted during the cracking step, which methane likewise passes into the synthesis cycle together with the hydrogen-nitrogen mixture. Thus, in order to prevent an excessive increase in the partial pressure of these inert gases in the reactor, a corresponding amount of gas must be continuously vented from the synthesis cycle. The helium concentration in this vent gas is more than ten times as high as in the natural gas employed; the other noble gases, e.g., argon, are similarly enriched therein. These noble gases stem from the helium concentration of the natural gas and from the air added during the cracking of the natural gas in accordance with the steam-reforming process, to the secondary reformer, or from the oxygen added during the cracking step in accordance with the partial oxidation process.

A principal advantage of this invention is that it is possible to recover helium without condensing natural gas. Furthermore, due to the increased helium concentration in the vent gases, the work and energy requirements for separating helium are lessened so that the helium content of natural gases low in helium need not be discarded. This invention, furthermore, not only provides for the extraction of helium from the vent gas of an ammonia synthesis plant, but it also provides for the recovery of argon contained in the vent gas, as well as for the recovery of high purity hydrogen, which can be recycled to the ammonia synthesis. Accordingly, the low temperatures involved in the enrichment of a helium containing gas are also beneficial and efficiently employed for the recovery of argon and hydrogen. As one preferred specific embodiment of this technique, liquid hydrogen formed during the partial condensation step is further treated in a stripping column to recover an enriched gaseous helium product.

It is especially advantageous to conduct the partial condensation of the hydrogen in two stages. In the first stage, condensed liquid and the gas in equilibrium therewith are separated in a column wherein the helium dissolved in the liquid hydrogen is simultaneously stripped off. In the second stage, the overhead from the stripping column is partially condensed, yielding a hydrogen liquid and a helium-enriched helium-hydrogen mixture. It is then advantageous to employ said hydrogen liquid derived from the overhead as reflux for the stripping column.

Suitably, the enriched helium-hydrogen mixture obtained from the second partial condensation is warmed countercurrently to gaseous streams to be cooled, and then reacted with oxygen to remove hydrogen in the form of $H_2O$. The thus-obtained raw helium is then freed, preferably by adsorption at a low temperature, from residual higher-boiling impurities, particularly neon.

The apparatus for conducting the process according to this invention is characterized in that a plant for the cracking of helium-containing natural gas, a plant for producing synthesis gas ($3H_2 + N_2$) from the cracking gas, and an ammonia synthesis plant are connected in series. The conduit for the vent gas branching off from the ammonia synthesis cycle is in communication, first, via at least one countercurrent heat exchanger, e.g., a tube or plate countercurrent heat exchanger, with a phase separator for the liquid formed by partial condensation, which liquid contains mainly nitrogen, argon, and methane. An additional conduit is connected from the head of the separator, via an expansion valve, to a regenerator plant operating at a temperature below the freezing point of the nitrogen, and from there through at least one more countercurrent heat exchanger, especially a tube or plate countercurrent heat exchanger, into the upper section of a separating column which is essentially a stripping column. From the sump of said column, a conduit is provided for withdrawing extremely pure liquid hydrogen, and from the head of which separating column a conduit is provided for withdrawing gaseous helium-enriched helium-hydrogen mixture.

BRIEF DESCRIPTION OF THE DRAWINGS

The low-temperature separation of vent gas from a synthesis cycle of an ammonia synthesis plant is schematically illustrated in the drawings, the synthesis gas having been derived from natural gas having a helium content of 400 p.p.m. The vent gas, after having been freed from water and ammonia, has the following composition in mol percent: 0.4% of He; 51.5% of $H_2$; 21.7% of $N_2$; 8.0% of Ar; and 18.4% of $CH_4$.

DETAILED DESCRIPTION OF EMBODIMENTS

Figure 1:
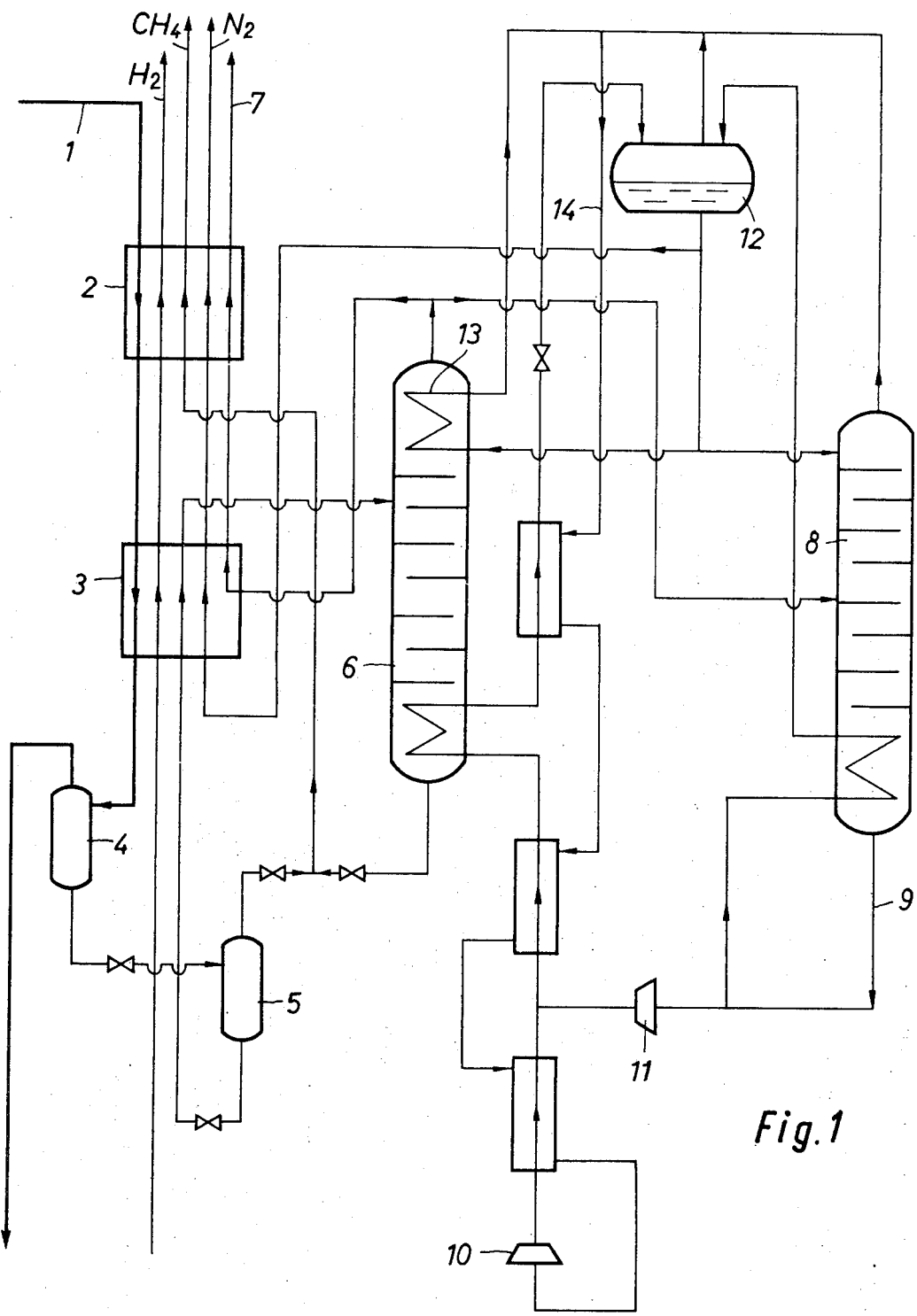
FIG. 1 depicts a portion of the system including a comprehensive treatment of the condensate.

According to FIG. 1, the vent gas is introduced at a pressure of 45 bar, via conduit 1, into the plant, and is cooled to about 80° K. in heat exchangers 2 and 3. During this procedure, the higher-boiling components, namely methane, argon, and nitrogen, are substantially condensed out of the vent gas stream and are removed in phase separator 4. The remaining gas consists of, by mols, 0.8% of He; 93.0% of $H_2$; 5.1% of $N_2$; 0.8% of Ar; and 0.3% of $CH_4$, and is further processed in the plant schematically illustrated in FIG. 2, as discussed later in detail.

The condensate from phase separator 4 in FIG. 1 is first expanded into the separator 5 in order to liberate dissolved lower-boiling components, and is then warmed and fed to the rectifying column 6 operating at about 2 bar. The sump product of this column is methane which leaves the plant as residual gas together with the fraction of the lower-boiling components stemming from the separator 5. As the head product, a gaseous nitrogen-argon mixture is obtained in column 6, which mixture is, in part, discharged as such via conduit 7. The other part is separated into its components in the rectifying column 8, where highly pure liquid argon is withdrawn via conduit 9, and gaseous nitrogen is withdrawn overhead.

The refrigeration required for these separation steps is provided by a nitrogen cycle. The nitrogen is first compressed in compressor 10 to about 195 bar and cooled countercurrently with itself. A portion thereof is expanded to about 7 bar in the expansion machine 11, passed the sump of column 8, where it provides reboiler heat, and is then expanded into the nitrogen tank 12. The other portion of the compressed nitrogen is further cooled countercurrently with itself, liquefied by vaporizing sump liquid in column 6, subcooled in heat exchange with itself, and then likewise expanded into the tank 12. A portion of the liquid nitrogen from tank 12 is directly fed to column 8 in order to scrub out the argon contained in the vapor rising therein; another portion is vaporized in the refrigerant side of the condenser 13 for the purpose of forming reflux liquid in the column 6, and a further portion serves as the refrigerant in the heat exchangers 3 and 2. The gaseous nitrogen is withdrawn through the manifold conduit 14, warmed counter-currently with itself, is passed to the suction side of the compressor 10 at about 1.1 bar.

Figure 2:
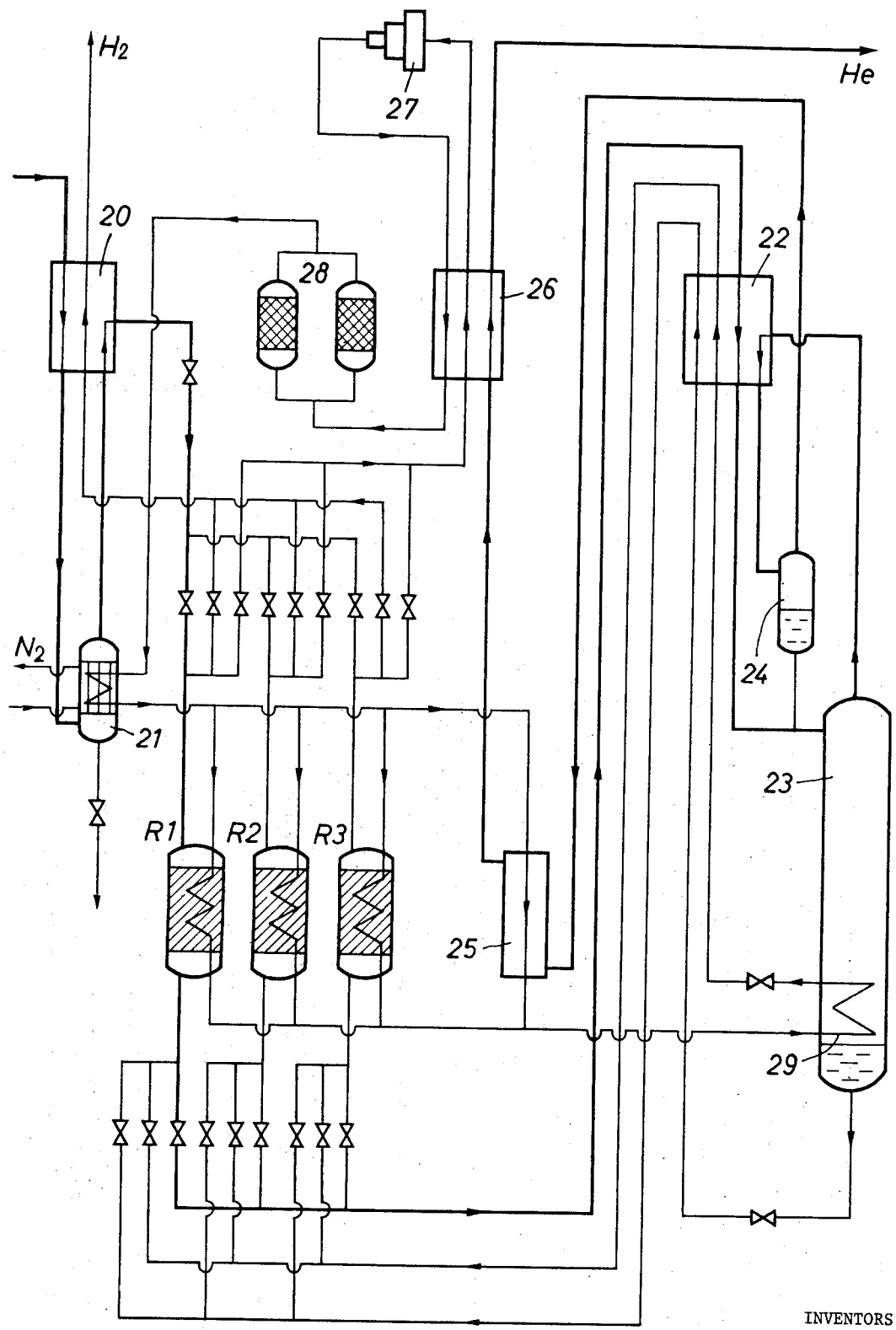
FIG. 2 depicts the other side of the system wherein the gaseous fraction from the partial condensation step is comprehensively treated.

Referring now to FIG. 2, the gas leaving the separator 4 at 80° K. is cooled in heat exchanger 20 against hydrogen to be warmed and in phase-separator heat exchanger 21 against nitrogen evaporating under a vacuum, to about 67° K. (The feed and discharge lines for the vacuum nitrogen are not shown, but for the sake of completeness, the feed is withdrawn as liquid from the nitrogen tank 12, and the discharged gaseous nitrogen is passed, via warming cross sections in the heat exchangers 20 and 2, to a vacuum pump. The conduit for passing the condensate collected in phase separator heat exchanger 21 to the phase separator 5 is likewise not illustrated.) The gaseous stream which now contains, in addition to hydrogen, only about 2 molar percent of nitrogen, 0.8 molar percent of helium, and small amounts of neon, is reheated in heat exchanger 20, and then expanded to about 7 bar. The expanded gas is then passed through at least one of the cyclically connected regenerators R1, R2 and R3, filled with lead packing and is cooled to about 30° K., during which step the nitrogen congeals on the packing, leaving only up to about 1 p.p.m. nitrogen in the gas.

The substantially nitrogen-free gas is then passed through heat exchanger 22 (where the hydrogen is partially condensed) and then fed to the head of the helium-hydrogen separating column 23. The head product of this column, containing about 10 molar percent of helium, is cooled to about 23° K. in heat exchanger 22, during which step hydrogen is once again partially liquefied, so that a gas can be withdrawn from separator 24 having about 60 molar percent of helium and 40 molar percent of hydrogen, with small quantities of neon. This helium-enriched gas is warmed in the heat exchangers 25 and 26 and fed to a helium purification plant, if desired. In the latter, the hydrogen is reacted with oxygen on a copper oxide catalyst, and the resultant gas is dried and purified by low-temperature adsorption.

The helium-free hydrogen product is withdrawn from the sump of column 23, expanded, vaporized in heat exchanger 22 against raw gas, and warmed. This hydrogen product is utilized in the regenerator R2, the so-called first purging cycle, to sublimate the material deposited on the packing. The attainable purity of the main quantity of hydrogen, accordingly, is approximately 98 molar percent. After the regenerator is purged, the hydrogen is warmed in heat exchanger 20 and then in the heat exchangers 3 and 2.

The refrigeration required for this separating process is produced by a high-pressure hydrogen cycle. In this connection, the cycle hydrogen is compressed by means of the compressor 27 from 1.1 bar to 80–140 bar, and cooled in heat exchanger 26. In the reversible adsorbers 28, any interfering trace components, especially nitrogen, are adsorbed. In the following phase-separator heat exchanger 21, the high-pressure hydrogen is cooled to 67° K. by means of nitrogen evaporating under vacuum. The high-pressure hydrogen is further cooled in the pipe coils of the regenerators and in the heat exchanger 25 to the inlet temperature of the evaporator 29 of the helium-hydrogen separating column 23. By cooling the high-pressure hydrogen in evaporator 29, the reboiler heat required for stripping out the helium in column 23 is provided and the hydrogen is condensed. The cooled condensed hydrogen is then expanded, and passed through the heat exchanger 22, where it transfers its refrigerant value to the raw gas stream, and is simultaneously vaporized. In the regenerator R3, the hydrogen is again heated in the so-called second purging cycle, during which step, traces of nitrogen are absorbed into the hydrogen. The resultant hydrogen stream is warmed to ambient temperature in the heat exchanger 26, and passed to the inlet side of the circulation compressor 27, where it is recompressed for another cycle.

With a helium concentration in the natural gas of only 400 p.p.m., it is possible to produce, by the present invention, about 300,000 Nm³ of helium per year, the consumption of natural gas being about 100,000 Nm³/h. and corresponding to a plant capacity of around 2,000 tons per day of ammonia. With an increasing concentration of helium in the natural gas, a correspondingly greater amount of helium can be produced, with the initial investment and the operating costs remaining almost the same. This invention is especially useful when employed with natural gas having at least 100, preferably at least 300 p.p.m. of helium. In such cases, the vent gases have the following composition range, on a molar percent basis:

| | |
|---|---|
| $H_2$ | 40–60 |
| $N_2$ | 10–30 |
| Ar | 5–15 |
| $CH_4$ | 15–25 |
| He | at least 0,1 preferably at least 0,3 |

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a helium-rich helium-hydrogen mixture, comprising:
   using as the starting material a vent gas from a plant for synthesizing ammonia from a gas mixture obtained by cracking a helium-containing natural gas, said vent gas comprising nitrogen, hydrogen, methane, argon and helium;
   partially condensing said vent gas to liquefy methane and argon and the major portion of the nitrogen;
   separating resultant liquid from gas in equilibrium therewith;
   reheating resultant equilibrium gas;
   cooling resultant reheated equilibrium gas in a regenerator to congeal residual nitrogen and any traces of argon and methane;
   partially condensing resultant substantially nitrogen-free gas from the regenerator to condense hydrogen liquid containing dissolved helium and separating said hydrogen liquid from gas in equilibrium therewith in a stripping column while simultaneously stripping said dissolved helium from said hydrogen liquid;
   withdrawing a hydrogen-helium mixture from the head of said stripping column and partially condensing said hydrogen-helium mixture to condense an additional hydrogen liquid;
   separating resultant helium-enriched hydrogen-helium mixture from said additional hydrogen liquid; and
   withdrawing said helium-enriched hydrogen-helium mixture from the process without passing same through a regenerator and recycling said additional liquid hydrogen to the stripping column as reflux.

2. Apparatus for producing a helium-enriched helium-hydrogen mixture, said apparatus comprising a plant for cracking of helium-containing natural gas to produce hydrogen, a plant for producing synthesis gas from the hydrogen cracking gas, and an ammonia synthesis plant connected in series;
   a branch for withdrawing vent gas from the ammonia synthesis plant;
   at least one countercurrent heat exchanger in communication with said branch for partially condensing vent gas;
   a phase separator in communication with said heat exchanger for separating a condensate of argon, methane and nitrogen from said vent gas, said phase separator having a head portion and a bottom portion;
   an expansion valve in communication with said head of said phase separator for reducing the pressure of remaining vent gas;
   regenerator means in communication with said expansion valve for congealing residual nitrogen, argon and methane;
   conduit means for effecting said communications;
   at least one additional countercurrent heat exchanger in communication with said regenerator means for partially condensing resultant nitrogen-free helium-hydrogen gaseous mixture;
   a stripping column having a head section and a sump;
   a second phase separator in communication with said one additional countercurrent heat exchanger, said second phase separator having a head portion and a bottom portion;
   a conduit connecting said bottom portion of said second phase separator with said head section of the stripping column;
   a conduit for withdrawing a gaseous helium-enriched helium-hydrogen mixture from said head portion of said second phase separator;
   a conduit connecting said at least one additional countercurrent heat exchanger with said head section of said stripping column; and
   conduit means for withdrawing liquid hydrogen from the sump of the stripping column, and for withdrawing a gaseous helium-enriched helium-hydrogen mixture from the top of the column.

3. A process as defined by claim 1 wherein said vent gas has the following molar percent composition:

| | |
|---|---|
| $H_2$ | 40–60 |
| $N_2$ | 10–30 |
| Ar | 5–15 |
| $Ch_4$ | 15–25 |
| He | at least 0.1 |

* * * * *